United States Patent [19]

Ooishi et al.

[11] 4,408,733
[45] Oct. 11, 1983

[54] MAGNETIC TAPE CASSETTE

[75] Inventors: Kengo Ooishi; Osamu Suzuki, both of Odawara, Japan

[73] Assignee: Fuji Photo Film Co., Ltd., Kanagawa, Japan

[21] Appl. No.: 304,465

[22] Filed: Sep. 22, 1981

[30] Foreign Application Priority Data

Sep. 24, 1980 [JP] Japan .................... 55-132591

[51] Int. Cl.³ ........................................... G11B 15/32
[52] U.S. Cl. ..................................... 242/199; 242/204
[58] Field of Search .................. 242/75.4, 198, 199, 242/204

[56] References Cited

U.S. PATENT DOCUMENTS 2,206,032 8/1938 Foster ........................... 242/198 X
3,259,331 8/1963 Liddle ............................. 242/198

FOREIGN PATENT DOCUMENTS 1094401 11/1953 France ............................ 242/198
47-23567 6/1972 Japan ............................. 242/198

Primary Examiner—Stanley N. Gilreath
Assistant Examiner—Lloyd D. Doigan
Attorney, Agent, or Firm—Sughrue, Mion, Zinn, Macpeak & Seas

[57] ABSTRACT

A magnetic tape cassette in which unwinding of the tape is prevented independent of the type of hub utilized. Each of the two hubs of the tape cassette includes a first cylindrical wall in which is formed a shaft hole adapted to receive a rotary drive shaft of the tape unit with which the cassette is used. A second cylindrical wall is formed coaxially with the first cylindrical wall and the second cylindrical wall has an engaging groove formed in an interior surface thereof. Also provided is a locking device including a crosswise locking member provided on the bottom of the lower half of the cassette case between the two hubs. The locking member includes a straight bar and arm with locking pawls substantially in the form of a cross and a spring member. The locking member is movable back and forth in the longitudinal direction of the straight bar and urged in one direction by the spring so that rotation in at least one direction of the hubs is stopped by engagement of the locking pawls with the engaging grooves.

7 Claims, 6 Drawing Figures

MAGNETIC TAPE CASSETTE

BACKGROUND OF THE INVENTION

The present invention relates to magnetic tape cassettes. More particularly, the invention relates to the structure of a magnetic tape cassette in the hollow interior of which a magnetic tape is laid over a pair of tape winding cores and is guided to run in a predetermined direction to perform a recording or playback operation.

In the case where tape winding cores (hereinafter referred to as "hubs") with flanges are employed in a conventional magnetic cassette, the flanges of the hubs must have a certain thickness in view of manufacturing requirements, storage and mechanical strength. Accordingly, the hub is overall considerably thick and large in size. Thus, the use of flanged hubs is a significant obstruction against the further miniaturization of magnetic tape cassettes.

Most conventional video tape cassettes employ such flanged hubs thus lowering the mobility of a video tape recorder using such cassettes. Since there has been a strong demand for the mobility of video tape recorders to be improved so that recording and playback operations can be readily conducted outdoors, reduction of the size and weight of the cassette is a considerably important factor.

In order to solve this problem, a variety of microcassettes have been proposed in which the hubs are of a flangeless type which makes it possible to miniaturize the cassette. For instance, a small video tape cassette has been disclosed in Japanese Patent Application No. 154420/1976. The structure of the cassette is as follows: Engaging grooves are formed in the circumferantial wall of each of the flangeless cylindrical hubs with the grooves being arranged coaxially with the hub and extending from the lower surface of the hub to the midpoint of the hub. A cylindrical engaging wall extends upwardly from the inner surface of the lower half of the cassette engaging with the engaging grooves of each hub. The engaging wall has a height substantially equal to the height of the engaging grooves. The height of the engaging wall is selected so that, when the cassette is not being used, the bottom surface of the engaging grooves is in contact with the top surface of the engaging wall or the lower surface of the circumferantial wall of the hub is in contact with the inner surface of the lower half of the cassette. Protrusions and recesses are formed on the two contacting surfaces so as to stop the rotation of the hub in the unwinding direction of the tape. Urging means is provided acting on the hub so that the two surfaces are held in contact with each other. A specific feature of this small video tape cassette is that, when the cassette is not being used, the two surfaces are brought into contact with each other to prevent the unwinding of the tape on the hubs.

The above-described small video tape cassette, however, is disadvantageous in the following point: It is necessary to provide a space in the cassette in the hollow interior defined by the two halves of the cassette so that the engaging grooves are vertically completely out of engagement with the engaging walls to thus allow rotation of the hubs. Due to this, the thickness of the cassette (i.e. the dimension in the widthwise direction of the tape) cannot be reduced to the desired extent to thereby decrease the size and weight of the cassette.

SUMMARY OF THE INVENTION

Accordingly, an object of the invention is to provide a magnetic tape cassette in which the above-described difficulties accompanying a conventional cassette are eliminated, and which prevents the undesirable unwinding of the tape irrespective of the hub type, especially independently of whether or not the hubs have flanges.

The foregoing object and other objects of the invention have been achieved by the provision of a magnetic tape cassette in which two magnetic tape winding hubs are arranged at right and left positions in the hollow interior of the cassette defined by the upper and lower halves thereof. A magnetic tape laid over the hubs is guided by tape running guiding means arranged symmetrically in right and left halves of the cassette so as to run across an opening formed in front of the hollow interior. According to the invention, the two hubs include first cylindrical walls forming shaft holes into which rotary drive shafts are inserted and second cylindrical walls formed coaxially with the first cylindrical walls. The second cylindrical walls each have an engaging groove cut in the inner surface thereof. Locking means composed of a crosswise locking piece is provided on the bottom of the lower half and between the two hubs. The locking piece is made up of a straight bar and arms with locking pawls substantially in the form a cross. The locking piece is movable back and forth in the longitudinal direction of the straight bar and urged in one direction by a spring member. Rotation at least in one direction of the two hubs is stopped by engagement of the locking pawls with the engaging grooves.

DESCRIPTION OF THE PREFERRED EMBODIMENTS

An example of a magnetic tape cassette constructed according to the invention, specifically, a small video tape cassette, will be described with reference to the accompanying drawings.

Figure 1:
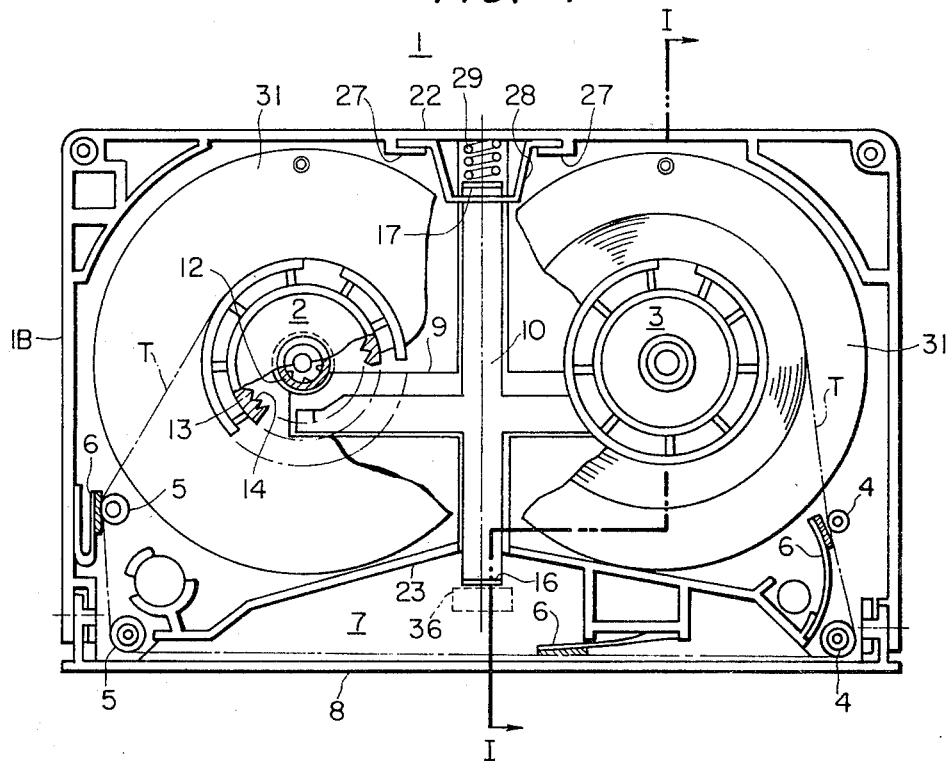
FIG. 1 is a plan view showing the internal construction of a cassette according to the invention.
Figure 2:
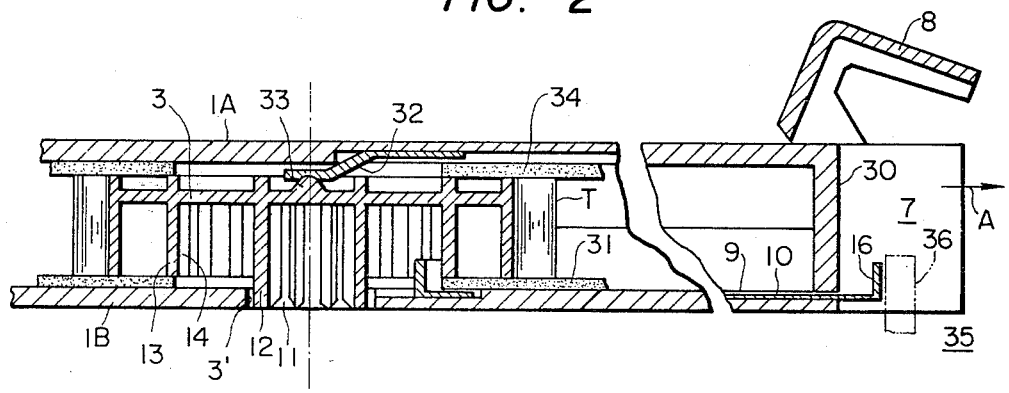
FIG. 2 is a sectional view taken along a line I—I in FIG. 1.

In the cassette 1 as shown in FIGS. 1 and 2, a pair of flangeless hubs 2 and 3 are disposed to the left and right, respectively, in the hollow interior defined by the upper half 1A and the lower half 1B of the cassette 1. A magnetic tape T is laid over the hubs 2 and 3. A tape exposing opening 7 is formed in the front part of the cassette 1. The tape T is wound on either the hub 2 or the hub 3 by being run and guided across the tape exposing opening 7 by tape running and guiding means including guide pins 4, guide rollers 5 and depressing thin members 6 which are arranged substantially symmetrically.

In order to prevent the magnetic tape T laid across the opening 7 from being damaged, a turnable guard panel 8 is pivotally mounted on both side walls of the cassette in such a manner that it can freely open or close the opening 7.

Significant structural features of the cassette of the invention are as follows:

1. A crosswise groove 9 is formed in the inner surface of the bottom of the lower half 1B. A movable locking piece 10 which is substantially similar in configuration to the crosswise groove 9 is inserted in the groove 9.

2. A first cylindrical wall 12 forms a shaft hole 11 into which each rotary drive shaft of a recording and playback device 35 (hereinafter referred to as "a VTR 35") is inserted, and a second cylindrical wall 13 is provided coaxially with the first cylindrical wall 12 in such a manner surrounding the first cylindrical wall 12. Sawtooth-shaped engaging grooves 14 are cut in the entire inner surface of the second cylindrical wall 13 with the grooves 14 extending parallel to one another from the lower opening of the wall 13 to the upper opening of the wall 13.

The movable locking member 10 and the engaging grooves 14 will be described in more detail with reference to FIGS. 3 and 4.

Figure 3:
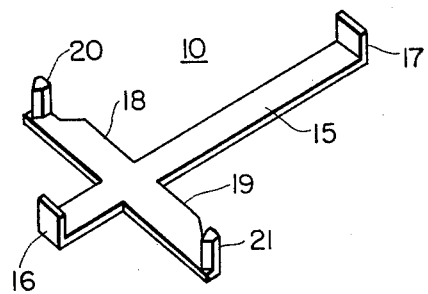
FIG. 3 is a perspective view of a locking member employed in the cassette according to the invention.

As shown in FIG. 3, the movable locking member 10 has receiving seats 16 and 17 which are formed by bending upwardly both end portions of a straight bar 15, and tooth-shaped locking pawls 20 and 21 which are disposed upright at end portions of left and right arms 18 and 19, respectively, which extend from the straight bar 15. The locking pawls 20 and 21 are engagable with the locking grooves 14 described above.

Figure 4:
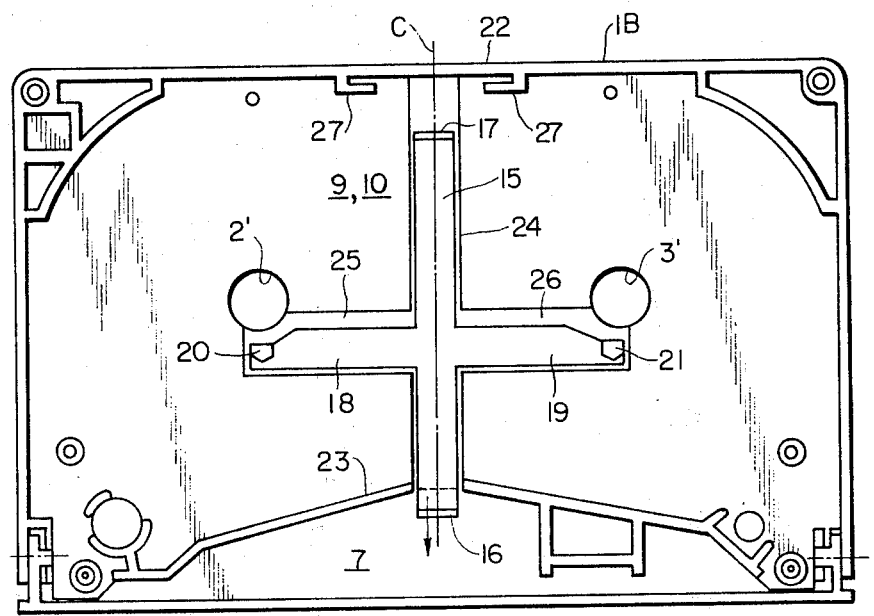
FIG. 4 is a plan view showing a positional relationship between the locking member and the lower half of the cassette of the invention.

As shown in FIG. 4, a region 24 for accommodating a straight bar 15 is provided in the inner surface of the bottom of the aforementioned lower half 1B extending from the inner side of the rear wall 22 towards the frontwall through the partition wall 23 of the opening 7. A pair of hub holes 2' and 3' are formed in the bottom of the lower half 1B so as to receive the lower end portions of the first cylindrical walls 12 for the hubs 2 and 3, respectively. Regions 25 and 26 for accommodating the aforementioned arms 18 and 19 extend left and right from the region 24 accommodating the straight bar 15 in such a manner that the regions 25 and 26 are substantially perpendicular to the region 24 and the hub holes 2' and 3' communicate with the region 24 accommodating the straight bar 15. Thus, the regions 24, 25 and 26 and the hub holes 2' and 3' form a substantially crosswise groove 9 in which the movable locking piece 10 except for the receiving seat 16 and a part near the seat 16, is accommodated.

More specifically, the groove 9 has a depth such that when the movable locking piece 10 is inserted into the groove 9, only the receiving seat 17 and locking pawls 20 and 21 are above the inner surface of the bottom of the lower half 1B, and a width so that the locking member 10 is suitably guided back and forth along the longitudinal center line C of the straight bar 15.

Thus, a large part of the locking member 10 is inserted in the groove 9 formed in the lower half 1B. In this case, a retaining member 28 having a U-shaped section is engaged with a pair of mounting seats 27 which are formed by protruding parts of the inner surface of the rear wall 22. As a result, the end portion where the receiving seat 17 is provided is prevented from being moved upwardly by an external force.

The receiving seat 17 is disposed between the rear wall 22 and the retaining member 28. The receiving seat 17 is depressed by a coil spring provided between the rear wall 22 and the outer end face of the receiving seat 17 so that the locking member 10 is urged towards the partition wall 23.

On the other hand, the receiving seat 16 is exposed outside the lower half 1B through the opening 7. As the partition wall 30 of the upper half 1A extends downwardly to a position near the groove 9 as shown in FIG. 2, the receiving seat 16 is prevented from being moved upwardly by an external force.

Thus, the retaining member 28 and the partition wall 10 positively prevent the entire locking member 10 from being moved upwardly from the groove 9 by an external force.

A substantially flat and smooth inner surface is provided for the bottom of the lower half 1B by covering the inner surface of the bottom of the lower half 1B with a separate relatively thin and smooth sheet 31. Therefore, unsatisfactory winding of the magentic tape T and damage to its edge attributed to the presence of the groove 9 and the locking member 10 is prevented After the separate sheet 31 is set in place, the hubs 2 and 3 are aligned with the centers of the hub holes 2' and 3', respectively, while the receiving seat 16 exposed in the opening 7 is depressed against the elastic force of the coil spring. As a result, the locking pawls 20 and 21 are inserted into the spaces which are defined by the first and second cylindrical walls 12 and 13. As the depression of the receiving seat 16 is released, the locking pawls 20 and 21 are moved towards the second cylindrical walls 13 of the hubs 2 and 3 until they engage with the engaging grooves 14, thus stopping the rotation of the hubs 2 and 3, respectively.

The state in which the rotation of the hubs 2 and 3 is stopped is maintained continuously during times other than when the cassette is not being used.

Protrusions 33 formed at the centers of the upper surfaces of the hubs 2 and 3 are depressed downwardly by the free ends of leaf springs 32 secured to the inner surface of the upper half 1A at all times so as to prevent unwanted movement or displacement of the hubs 2 and 3.

A sheet 34 similar to the aforementioned sheet 31 is inserted between the inner surface of the upper half 1A and the hubs 2 and 3 so that the upper edge of the magnetic tape T is smoothly guided.

When the cassette 1 formed as described above according to the invention is loaded in the VTR 35 by moving the cassette 1 in the direction of the arrow A with the opening 7 facing forwardly, it is automatically opened by an opening device of known design provided on the VTR 35. At the same time, a depressing member 36 of the VTR 35 is inserted into the opening v as shown in FIG. 2. Therefore, as the cassette 1 is moved in the direction of the arrow A, the receiving seat 16 is moved backwards, or towards the rear wall 22, against the elastic force of the coil spring 29 with the outer end face of the receiving seat 16 abutted against the depressing member 36. Therefore, the locking pawls 20 and 21, leaving the groove 9, move towards the first cylindrical walls 12. As a result, the hubs 2 and 3 are allowed to freely turn.

In constrast, when the cassette 1 is removed from the VTR 35, the above-described operation is completely reversed to lock the hubs 2 and 3.

The degree of back and forth displacement of the locking member 10 can be continuously regulated by suitably selecting the relative positions of the seats 16 and 17 and the retaining member 28 and the partition wall 30 or the contact positions of the arms 18 and 19 and the arm accommodating regions 25 and 26.

Figure 5:
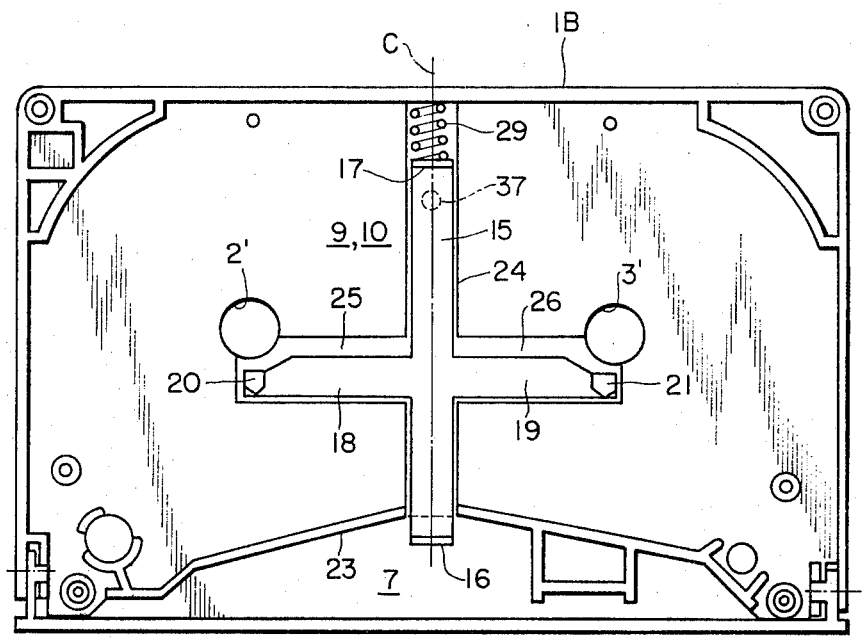
FIGS. 5 and 6 are plan views showing modifications of the cassette according to the invention.

The cassette may be modified as shown in FIG. 5. In this modification, the mounting seats 27 and the retaining member 28 are eliminated. In this place, a pin 37 protruding from the inner surface of the upper half 1A for mounting the separate sheet 37 is set close to the end portion of the upper surface of the straight bar 15 where the receiving seat 17 is provided so that upward movement of locking member 10 is prevented.

Figure 6:
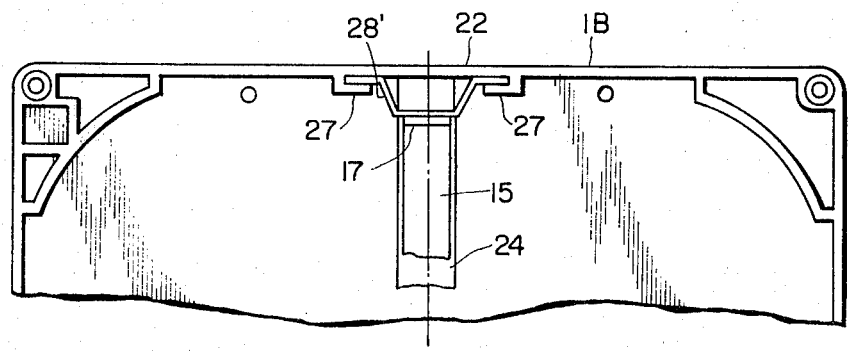

The cassette may be modified as shown in FIG. 6. In this modification, the coil spring 29 is eliminated and the retaining member 28 is replaced by a leaf spring member 28' which is engaged with the receiving seat 17.

The above-described engagement of the engaging groove 14 and the locking pawls 20 and 21 can be established not only in the case of the above-described flangeless hubs 2 and 3 but also in the case of flanged hubs. In the latter case, the separate sheets 31 and 34 can be eliminated, and the flanged hubs can be placed directly on the inner surface of the bottom of the lower half 1A which is made flat by eliminating the groove 9 therefrom.

Furthermore, the cassette can be modified as follows: The receiving seat 16 of the locking piece 10 is disposed inside the lower half 1B instead of protruding into the opening 7. A groove is formed in the lower half 1B so as to allow the depressing member 26 to pass freely in and out of the lower half 1B through the partition wall 23, whereby the depressing member 36 is abutted against the receiving seat 16 inside the cassette 1.

That is, all that is necessary is to urge the crosswise locking member 10 in one direction at all times and to provide locking means which utilizes the straight movement of the locking member to allow the locking member to move into and out of engagement with the engaging grooves 14.

The teeth of the engaging grooves 14 may be modified to have an angle by which the hubs 2 and 3 are rotatable in one direction at all times.

As is apparent from the above description, in the cassette according to the invention, the locking member including the spring member and the crosswise locking member is moved perpendicularly to the axial direction of each hub to permit the locking pawls to move in and out of engagement with the sawtooth-shaped engaging grooves which are formed in the inner walls of the hubs parallel to the axial direction thereof. Therefore, it is unnecessary to move the hubs vertically for every locking operation. Accordingly, the space inside the cassette, and especially the space in the direction of the tape width, can be reduced thereby facilitating reductions of the size and weight of the cassette.

The above-described advantageous effects of the cassette according to the invention will be obtained with for cassettes with flanged hubs and with cassettes which are designed for use in audio equipment or computers.

What is claimed is:

1. A magnetic tape cassette comprising: a cassette case having upper and lower halves; first and second magnetic tape winding hubs arranged in respective right and left positions in an interior of said cassette defined by said upper and lower halves of said case, each of said two hubs comprising a first cylindrical wall forming a shaft hole adapted to receive a rotary drive shaft, and a second cylindrical wall formed coaxially with said first cylindrical wall, said second cylindrical wall having a plurality of engaging grooves formed in an inner surface thereof; locking means comprising a crosswise locking member slidably supported on a bottom of said lower half between said hubs, said locking member comprising a straight bar and oppositely extendable arms substantially in the form of a cross with an upstanding pawl on the outer end of each arm disposed intermediate said first and second cylindrical walls and a spring member, said locking member being moveable back and forth in the longitudinal direction of said straight bar and being urged in one direction by said spring member to bias said pawls into engagement with said grooves, rotation in at least one direction of said hubs being stopped by engagement of said locking pawls with said engaging grooves; a magnetic tape laid over said hubs; and a tape running guiding means arranged symmetrically right and left in said case so as to guide said tape across an opening in said case in a front portion thereof.

2. The magnetic tape cassette as claimed in claim 1, wherein said hubs are flangeless.

3. The magnetic tape cassette as claimed in claim 1, wherein said hubs have flanges.

4. The magnetic tape cassette as claimed in claim 1, wherein said spring member of said locking means comprises a coil spring.

5. The magnetic tape cassette as claimed in claim 1, wherein said spring member of said locking means comprises a leaf spring.

6. The magnetic tape cassette as claimed in claim 1, wherein said straight bar of said locking member has receiving seats at both ends thereof, one of said receiving setas protruding into said opening.

7. The magnetic tape cassette as claimed in claim 6, wherein said receiving seats of said straight bar are arranged so as to be in said hollow interior of said cassette at all times.

* * * * *